Figure 1:
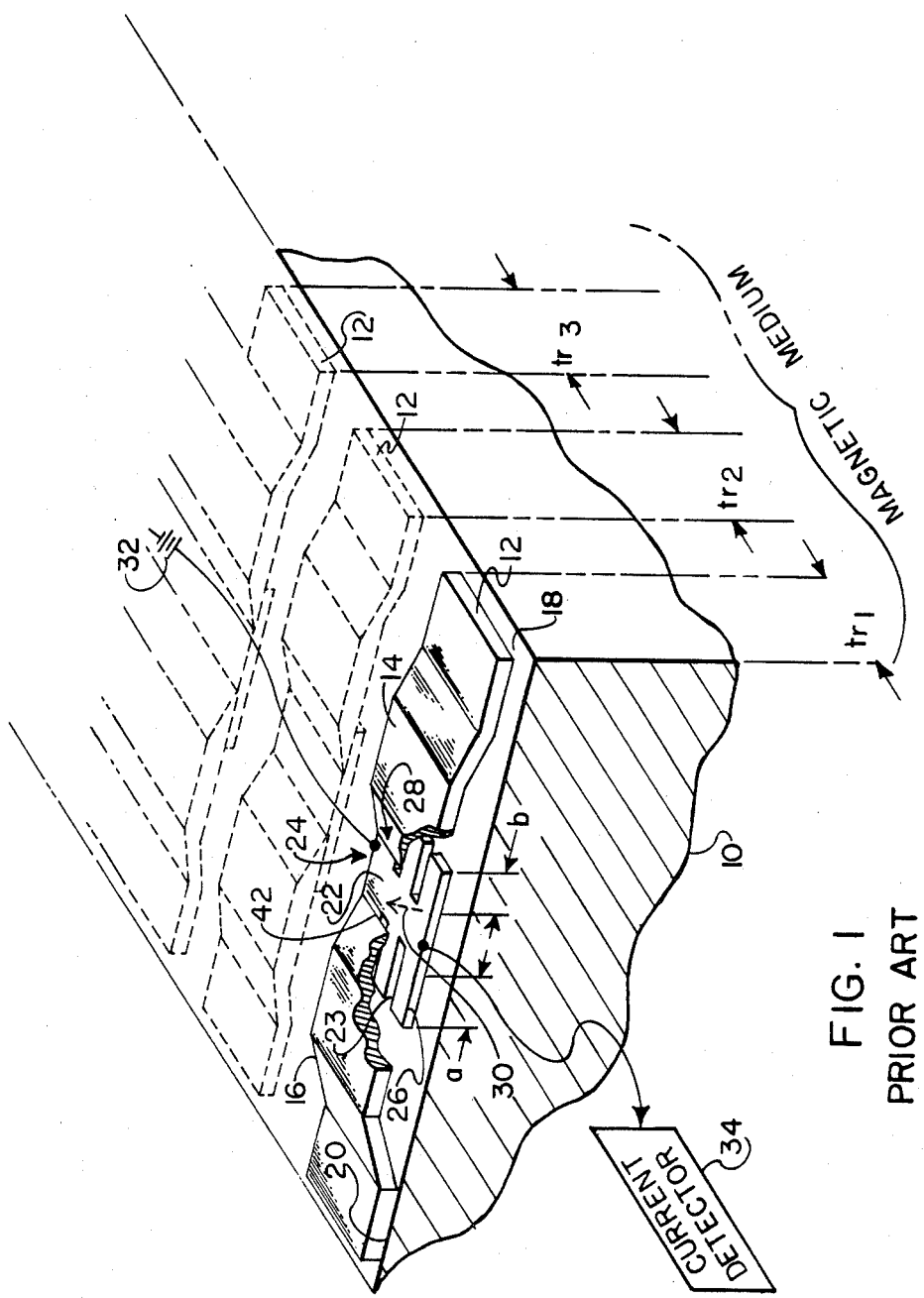

United States Patent [19]

Jeffers et al.

[11] Patent Number: 4,683,508
[45] Date of Patent: Jul. 28, 1987

[54] MAGNETO-RESISTIVE HEAD WITH REDUCED THERMAL NOISE

[75] Inventors: Frederick J. Jeffers, Escondido; John L. Simonds, San Diego, both of Calif.

[73] Assignee: Eastman Kodak Company, Rochester, N.Y.

[21] Appl. No.: 693,957

[22] Filed: Jan. 23, 1985

[51] Int. Cl.⁴ .......................... G11B 5/127; G11B 5/33
[52] U.S. Cl. ........................................................ 360/113
[58] Field of Search ........................................ 360/113

[56] References Cited

FOREIGN PATENT DOCUMENTS

| 57-208622 | 12/1982 | Japan | 360/113 |
| 59-36320 | 2/1984 | Japan | 360/113 |
| 223921 | 12/1984 | Japan | 360/113 |

OTHER PUBLICATIONS

Feng, J. J. "Initializing Single-Domain States in Barberpole Magnetoresistive Sensors", vol. 20, No. 6, Nov. 1977, IBM Tech. Disclosure Bulletin, pp. 2441-2442.

*Primary Examiner*—Robert S. Tupper
*Assistant Examiner*—Melissa J. Koval
*Attorney, Agent, or Firm*—Robert F. Cody

[57] ABSTRACT

To lessen thermal noise in a magneto-resistive head employing a slotted magneto-resistive sensing element, the present invention provides for such element to be plated with a highly thermally conductive film (e.g. gold, silver, copper, aluminum, etc.) exclusively in the slotted portion of the element. By restricting such plating to the slotted portion of the sensing element, the film thereon will be precluded from electrically short circuiting the magneto-resistive sensing element . . . while, at the same time, serving as an energy-spreading heat sink.

6 Claims, 4 Drawing Figures

MAGNETO-RESISTIVE HEAD WITH REDUCED THERMAL NOISE

BACKGROUND OF THE INVENTION

1. Field of the Invention

This invention relates in general to magnetic flux sensing apparatus and, in particular, to a magnetic head of the type employing a thin magnetic film structure as a magneto-resistive element responsive to the flux being sensed.

2. Background Relative to the Prior Art

Playback of recorded signals from a magnetic recording medium by means of a conventional magnetic head that is sensitive to flux rate-of-change is difficult for low recorded signal frequencies, and theoretically impossible for recorded DC signals, or when there is no relative motion between the recording medium and the magnetic head. Accordingly, various techniques have been proposed for sensing magnetic flux, as opposed to the rate-of-change of such flux, e.g. Hall effect, flux gate, and magneto-resistive devices, thereby to permit recording media to be used as optimally as possible.

With regard to the matter of magneto-resistive devices for sensing magnetic fields, the use of a thin magnetic film for field sensing purposes is known. Representative prior art depicting the use of magneto-resistive thin-film structures can be found in the following references: U.S. Pat. No. 3,731,007; U.S. Pat. No. 3,947,889; U.S. Pat. No. 3,921,218; U.S. Pat. No. 3,945,038; U.S. Pat. No. 4,051,542; and U.S. Pat. No. 4,413,296. Typically, a thin (planar) magneto-resistive film is employed to sense a magnetic field to which it is exposed by passing an electrical sense current (either AC or DC) through the film, the film magnetization vector being canted with respect to the direction of current flow. The field being sensed exerts a torque on the magnetic moment of the film, causing the resistance of the film to increase or decrease depending on the sense and magnitude of the field. The resistance of the film is, therefore, the analog of the field strength.

There are, within the prior art, two general types of thin-film magneto-resistive heads: a first type in which a medium-contacting structure in a magnetic yoke (or similar element) carries recorded signal flux away from a magnetic recording medium and applies such flux to a thin-film magneto-resistive element disposed in a given region of the yoke (or similar element); and a second type in which an edge of a magneto-resistive element is adapted to ride along the surface of a magnetic recording medium to pick up magnetic signals recorded thereon. Compending U.S. patent application Ser. No. 644,894, U.S. Pat. No. 4,644,430, filed in the name of William French, is directed to the concept of slotting "yoke-connecting" portions of the magneto-resistive element of the first type magneto-resistive head, thereby to preclude the magnetic short circuiting of signal flux by the yoke. By contrast, published Japanese Application No. 56-198506 is directed to the idea of slotting that side of magneto-resistive element of the second type magneto-resistive head which is distal with respect to its medium contacting edge, thereby to force sense current into the flux sensing edge region of the magneto-resistive element. The invention, as will appear below, is applicable to both types of magneto-resistive heads.

Magneto-resistive elements employed in connection with magneto-resistive heads are characterized by a susceptibility to thermally generated noise. This is especially so in the case of the aforenoted second type of magneto-resistive head, since the signal sensing magneto-resistive element of such a head is adapted to ride abradingly, in contact with the medium the recorded signals of which it is disposed to sense.

SUMMARY OF THE INVENTION

To lessen thermal noise in a magneto-resistive head employing a slotted magneto-resistive sensing element, the present invention provides for such element to be plated with a highly thermally conductive film (e.g. gold, silver, copper, aluminum, etc.) exclusively in the slotted portion of the element. By restricting such plating to the slotted portion of the sensing element, the film theron will be precluded from electrically short circuiting the magneto-resistive sensing element . . . while, at the same time, serving as an energy-spreading heat sink. It should be appreciated that, without the practice of slotting a magneto-resistive sensing element, the idea of depositing a highly thermally conductive film atop the magneto-resistive sensing element would be utterly impractical since such a film would electrically short circuit any sense current that was employed with the magneto-resistive sensing element.

Figure 2:
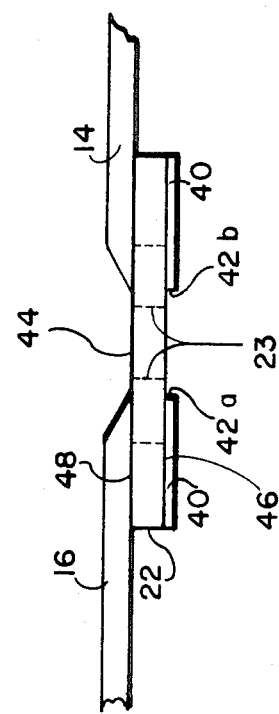
Figure 3:
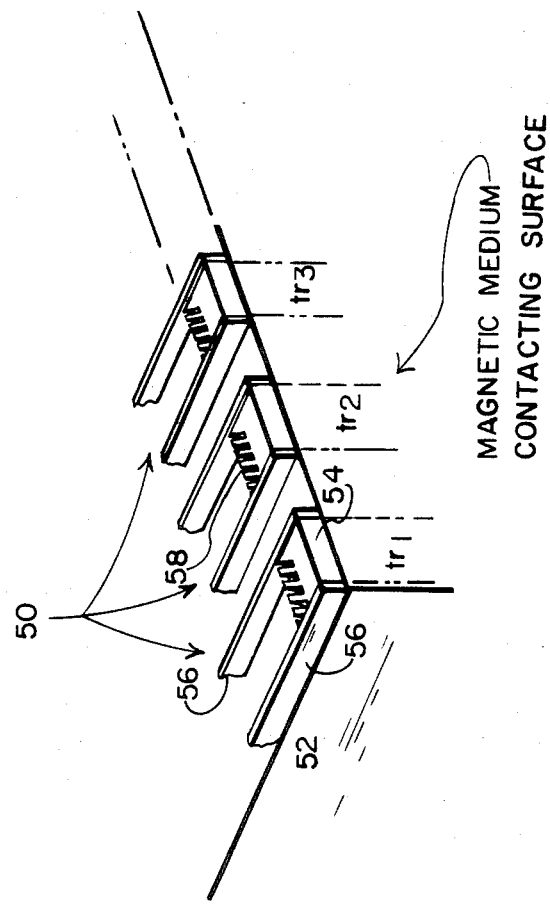
Figure 4:
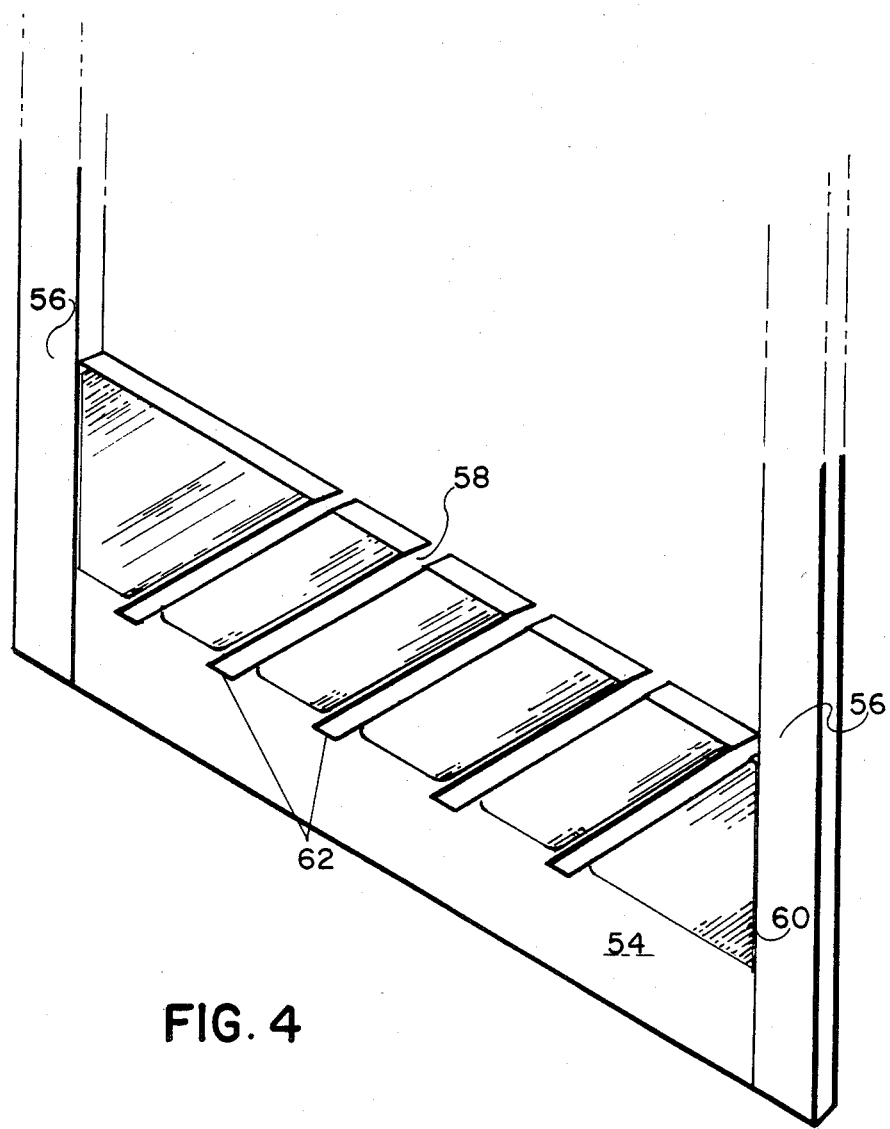

To provide further appreciation for the state of the art, as well as to facilitate understanding of the invention, reference is made to the accompanying figures of which:

FIG. 1 is a schematic view, in perspective, of a prior art yoke-type magneto-resistive and adaptable to the practice of the invention, FIG. 2 is a side elevational view of a magneto-resistive head structure encompassing the teaching of the invention, FIG. 3 is a schemtic view, in perspective, of another prior art magneto-resistive head adaptable to the practice of the invention, and FIG. 4 is a perspective view of a magneto-resistive sensing element modified according to the invention, such element being useful in a head of the type depicted in FIG. 3.

Referring to FIG. 1, a typical prior art multitrack yoke-type magneto-resistive playback head, improved pursuant to the teaching of U.S. patent application Ser. No. 644,894, U.S. Pat. No. 4,644,430 is shown having a ferrite substrate 10 and a succession of thin-film core structures 12 deposited thereon. Only one core structure 12 is depicted in FIG. 1 with "unbroken" lines—the others being in phantom—because all such core structures work in exactly the same way; thus, to understand the way in which the "full-line" core structure 12 works is to understand how all such core structures work.

As indicated, the core structure 12 comprises first and second spaced apart permeable film members 14, 16, typically of permalloy. By virtue of means (usually a thin film of $SiO_2$) not depicted in FIG. 1, the permeable film member 14, together with the ferrite substrate 10, forms a transducer gap 18. The permeable film member 16, on the other hand, contacts the ferrite substrate 10 at 20, thereby to provide a magnetic short circuit from the permeable film member 16 to the ferrite substrate 10.

A thin magneto-resistive film 22 bridges the space 24 between the permeable film members 14, 16 and is magnetically short circuited to such members at 26, 28. According to the teaching of U.S. patent application Ser. No. 644,894, U.S. Pat. No. 4,644,430 the magneto-resistive film 22 is slotted (23) to preclude the partial shorting of electrical current in the magneto-resistive film 22 by means of those parts of the film 22 which contact the permeable film members 14, 16, thereby to force all of the sense current to flow in that part of the film 22 where the signal field is large. Signal flux which enters the transducer gap 18 is forced to traverse the thin magneto-resistive film 22 as the flux completes its loop via the ferrite substrate 10. As is the practice, the magnetic moment, as represented by the magnetization vector 30 of the magneto-resistive film 22, is canted (either by a suitable bias field or by a deposition technique employed during formation of the film 22) in the plane of the magneto-resistive film. When signal flux traverses the magneto-resistive film 22, the angle that the magnetization vector 30 makes with respect to the direction of current—introduced from a source 32—varies accordingly. Attendantly, the resistance of the magneto-resistive film 22 varies as a function of the applied signal flux, thereby causing a current detector 34 to produce an appropriate analog signal.

Sense current which flows through the magneto-resistive film 22 is productive of noise-generating heat. To lessen thermal noise in the magneto-resistive film 22, therefore, the invention provides that such film 22 be provided—as depicted in FIG. 2—with a complementary film (for example, of about 1 or 2 microns thick) of a highly thermally conductive film 40 of gold, silver, copper, or the like. To be noted is that the complementary "thermal" film 40 ends at the points 42 a, 42 b, i.e. does not extend into the sense region 44 of the magneto-resistive film 22, thereby to preclude undesired electrical short circuiting of the sense region 44 by the complementary "thermal" film 40. Attendantly, heat generated within the magneto-resistive sense element can escape the sense region 44 and be distributed evenly away from such region. In its preferred form, the complementary "thermal" film 40 is deposited on the face 46 of the magneto-resistive film 22, as opposed to being deposited on the face 48 thereof, thereby to provide better "magnetic" contact between the elements 14, 16 and the magneto-resistive film 22.

As indicated above, the invention is also useful in connection with a magneto-resistive head of the type in which the edge of a magneto-resistive sensing element is adapted to ride in contact with a magnetic recording medium. Such a head, in multitrack form, is depicted in FIG. 3 as comprising a plurality of essentially identical track-sensing structures 50. Each such structure 50 is deposited on non-magnetic substrate 52; and as to each such structure 50, a magneto-resistive sensing element 54 is straddled by, and electrically connected to, a pair of electrical leads 56. Sense current is carried to and across the magneto-resistive sensing element 54 by means of the leads 56 and—depending on the polarity and strength of "track" signals sensed at the medium contacting edge of the element 54—the sense current is varied accordingly. Pursuant to the teaching of Japanese patent application No. 56-198506, the magneto-resistive sensing element 54 is slotted at 58, thereby to force sense current to flow in proximity to the flux-carrying medium and, thus, improve the sensitivity of the element 54 to such flux.

Pursuant to the teaching of the invention as herein disclosed, a film 60 of high thermal conductivity (gold, silve, copper, etc.) is formed atop the element(s) 54 as depicted in FIG. 4. Such a film, as noted earlier, acts as a heat sink which distributes energy away from the track-sensing edge of the element 54, whereby thermal noise within the magneto-resistive element 54 is lessened. As was the case with the structure of FIGS. 1, 2, the film 60 (intentionally) resides only over the slotted (58) region of the magneto-resistive element 54, and does not extend (62) to the non-slotted region of the element 54. This is done in the interest of preventing the film 60 from becoming an electrical short circuit from one lead 56 to the other.

The invention has been described in detail with particular reference to certain preferred embodiments thereof, but it will be understood that variations and modifications can be effected within the spirit and scope of the invention.

What is claimed is:

1. A sensor for use in a magneto-resistive head comprising
   a. means supporting an elongated film of magneto-resistive material, said elongated film connected to a pair of electrical leads, one lead located on each side of said film, and said elongated film having a first region adjacent to a magnetic recording medium and a second region having one or more generally crosswise slots therein for preventing current flow within said magneto-resistive film in the second region, and
   b. thermally conductive means on said magneto-resistive film exclusively in the region thereof having said slots.

2. The sensor of claim 1 wherein said means on said magneto-resistive film is a film of metal having a high degree of thermal conductivity.

3. The sensor of claim 2 wherein the metal film on said magneto-resistive film is comprised of a metal from the class thereof comprised of gold, silver, copper, and aluminum.

4. A magneto-resistive head having
   a. a body member, and
   b. a magneto-resistive sensor supported by said body member, said sensor comprising
   (a) means supporting an elongated film of magneto-resistive material, said elongated film connected to a pair of electrical leads, one lead located on each side of said film, and said elongated film having a first region adjacent to a magnetic recording medium and a second region having one or more generally crosswise slots therein for preventing current flow within said magneto-resistive film in the second region, and
   (b) thermally conductive means on said magneto-resistive film exclusively in the region thereof having said slots.

5. The sensor of claim 4 wherein said means on said magneto-resistive film is a film of metal having a high degree of thermal conductivity.

6. The sensor of claim 5 wherein the metal film on said magneto-resistive film is comprised of metal from the class thereof comprised of gold, silver, copper, and aluminum.

* * * * *